US012724853B1

(12) United States Patent
Pogers

(10) Patent No.: US 12,724,853 B1
(45) Date of Patent: Sep. 1, 2026

(54) LICENSE SERVER CACHING FOR CHECKOUT OF FLOATING LICENSES

(71) Applicant: Synopsys, Inc., Sunnyvale, CA (US)

(72) Inventor: Mark Daniel Pogers, Wake Forest, NC (US)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 18/222,175

(22) Filed: Jul. 14, 2023

Related U.S. Application Data

(60) Provisional application No. 63/389,630, filed on Jul. 15, 2022.

(51) Int. Cl.
*G06F 21/10* (2013.01)

(52) U.S. Cl.
CPC ........ *G06F 21/105* (2013.01); *G06F 21/1075* (2023.08)

(58) Field of Classification Search
CPC .................................................... G06F 21/105
USPC ........................................................... 705/59
See application file for complete search history.

(56) References Cited

U.S. PATENT DOCUMENTS 6,842,896 B1 * 1/2005 Redding ............... G06F 21/105 717/172
6,920,567 B1 * 7/2005 Doherty .................. G06F 21/10 713/168
7,051,212 B2 * 5/2006 Ginter .................... G06Q 20/14 380/231
7,631,318 B2 * 12/2009 Cottrille .............. H04L 63/0823 726/17
7,962,424 B1 * 6/2011 Colosso ................. G06Q 30/06 705/901
8,510,226 B2 * 8/2013 Coley ..................... H04L 63/02 709/200
8,620,818 B2 * 12/2013 Hughes .................. G06Q 99/00 726/32

(Continued)

FOREIGN PATENT DOCUMENTS

WO WO-9220021 A1 * 11/1992 ............. G06Q 30/04
WO WO-9904354 A1 * 1/1999 ............. G06Q 30/04
WO WO-2015063936 A1 * 5/2015 ........... G06F 21/105

OTHER PUBLICATIONS

• Microsoft. "Demystifying Microsoft Server Licensing." (Apr. 24, 2020). Retrieved online Jul. 21, 2025. https://certifiedcio.com/certified-cio-blog/demystifying-microsoft-server-licensing/ (Year: 2020).*

(Continued)

*Primary Examiner* — James A Reagan
(74) *Attorney, Agent, or Firm* — WOMBLE BOND DICKINSON (US) LLP

(57) ABSTRACT

A method includes: receiving an input job associated with a license type; receiving a license server order including a plurality of license servers; reading license server information regarding the plurality of license servers from a license server information cache; updating, by a processing device, the license server order based on the license server information to compute an updated license server order; and accessing at least one of the plurality of license servers in the updated license server order to attempt license checkout of a license from one of the plurality of license servers, the license being appropriate for the license type of the input job.

20 Claims, 10 Drawing Sheets

(56) References Cited

U.S. PATENT DOCUMENTS 8,650,557 B2 * 2/2014 Ogura .................... G06F 21/10 717/169
8,688,583 B2 * 4/2014 Boccon-Gibod ..... H04L 9/3247 705/50
8,739,298 B2 * 5/2014 Biswas ................. G06F 21/105 726/1
8,751,793 B2 * 6/2014 Ginter ................ H04N 21/6581 726/28
8,850,605 B2 * 9/2014 Koka .................... G06F 21/105 705/310
9,183,359 B2 * 11/2015 Schmidt ................ G06F 21/105
10,140,672 B2 * 11/2018 Hohlfeld ................ G06Q 30/06
11,023,621 B2 * 6/2021 Torres ..................... G06F 21/76
2001/0011253 A1 * 8/2001 Coley .................... G06Q 99/00 705/59
2003/0159033 A1 * 8/2003 Ishiguro .................. G06F 21/10 380/278
2004/0148229 A1 * 7/2004 Maxwell ................. H04L 67/34 705/14.73
2005/0015343 A1 * 1/2005 Nagai ..................... G06F 21/10
2005/0149340 A1 * 7/2005 Murakami ............ G06F 21/105 705/902
2006/0015466 A1 * 1/2006 Noioso ................... G06F 21/10 705/59
2006/0059561 A1 * 3/2006 Ronning ............ G06Q 20/1235 726/26
2006/0106727 A1 * 5/2006 Yellai ........................ H04L 9/08 375/E7.009
2006/0265337 A1 * 11/2006 Wesinger ................ G06F 21/10 705/65
2006/0271915 A1 * 11/2006 Stefik .................... H04L 9/3218 717/127
2007/0033395 A1 * 2/2007 MacLean .............. G06F 21/105 713/157
2007/0100768 A1 * 5/2007 Boccon-Gibod ..... H04L 9/3271 705/59
2007/0265976 A1 * 11/2007 Helfer ..................... G06F 21/10 705/59
2008/0103977 A1 * 5/2008 Khosravy ............... H04L 63/10 705/59
2008/0319779 A1 * 12/2008 Hughes .................. G06Q 99/00 705/310
2010/0030851 A1 * 2/2010 Inden ...................... H04L 63/10 709/228
2014/0033315 A1 * 1/2014 Biswas ................. G06F 21/105 726/26
2015/0082454 A1 * 3/2015 Silin ...................... G06Q 99/00 726/27
2015/0170443 A1 * 6/2015 Bower .................. G06F 21/105 340/5.6
2016/0171186 A1 * 6/2016 Marking ............ H04N 21/4627 713/189
2016/0335421 A1 * 11/2016 Savage .............. G06Q 20/3821
2017/0024548 A1 * 1/2017 Dorwin ................. G06F 21/105
2017/0161470 A1 * 6/2017 Feng ..................... G06F 21/105
2017/0357785 A1 * 12/2017 Kim ...................... H04L 9/0894
2017/0372045 A1 * 12/2017 Dondl ................... G06F 21/121
2020/0169455 A1 * 5/2020 Nakagawa ............ G06F 21/105
2020/0364317 A1 * 11/2020 Phirmis ................... G06F 21/44

OTHER PUBLICATIONS

• Marco Bertini. “how to renew subscriptions user licenses.” (Apr. 24, 2020). Retrieved online Jul. 21, 2025. https://community.citrix.com/forums/topic/241300-how-to-renew-subscriptions-user-licenses/ (Year: 2020).*
• Cisco. “Cisco Smart Software Manager On-Prem.” (May 2020). Retrieved online Jul. 21, 2025. https://www.cisco.com/c/dam/en_us/buy/smart-accounts/ssm-satellite-enhanced-edition-faqs-2018.pdf (Year: 2020).*

* cited by examiner

License Server A
State: U
License Server B
State: U
License Server C
State: Y
310A
320A
330A License Server A
State: U
License Server B
State: U
License Server C
State: Y
310B
320B
330B License Server C
State: Y
License Server A
State: U
License Server B
State: U
330C
310C
320C

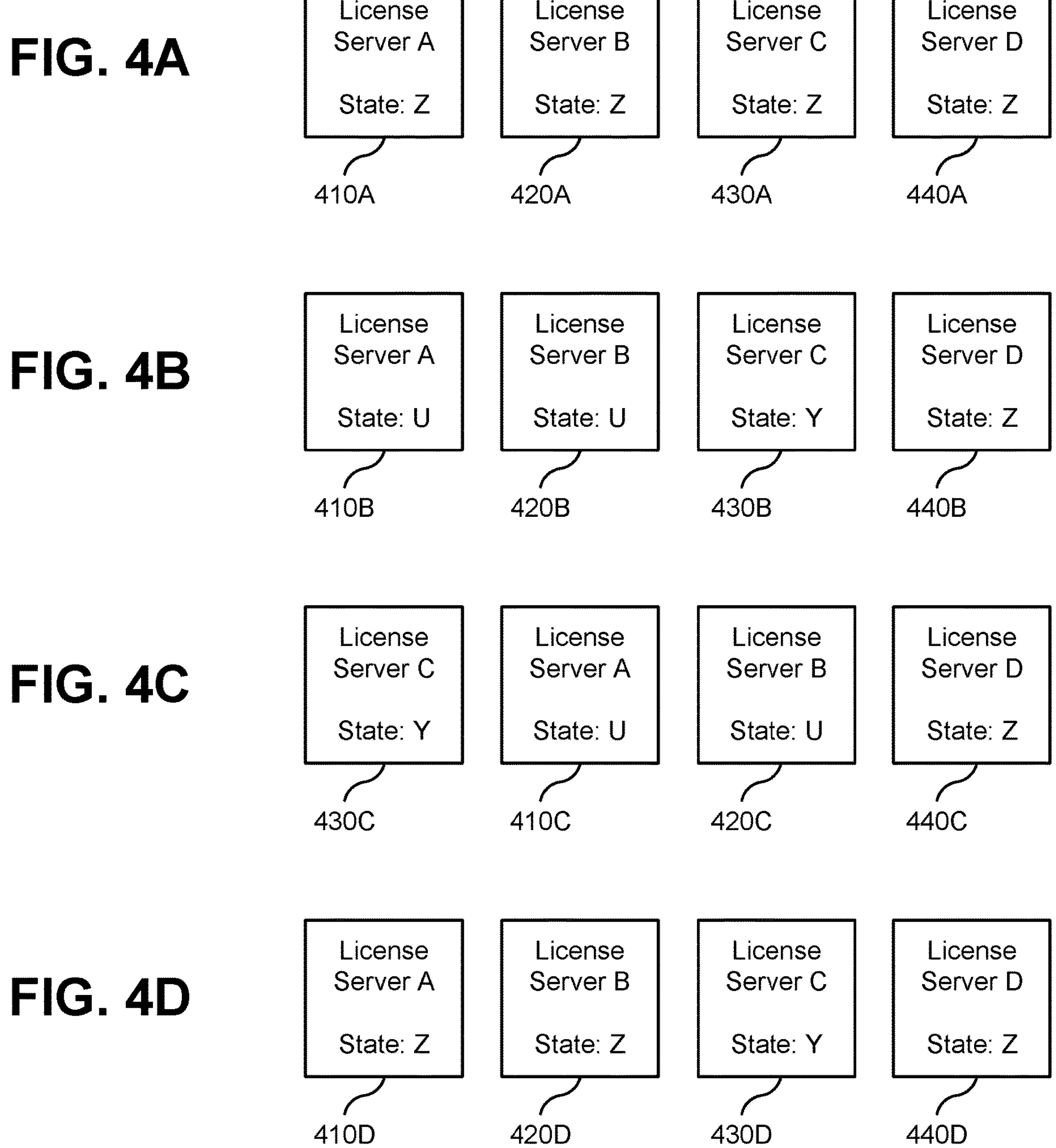
FIG. 4A
License Server A State: Z
License Server B State: Z
License Server C State: Z
License Server D State: Z
410A
420A
430A
440A
FIG. 4B
License Server A State: U
License Server B State: U
License Server C State: Y
License Server D State: Z
410B
420B
430B
440B
FIG. 4C
License Server C State: Y
License Server A State: U
License Server B State: U
License Server D State: Z
430C
410C
420C
440C
FIG. 4D
License Server A State: Z
License Server B State: Z
License Server C State: Y
License Server D State: Z
410D
420D
430D
440D License Server A
State: U
License Server B
State: Y
License Server C
State: Y
License Server D
State: Z
410E
420E
430E
440E License Server B
State: Y
License Server C
State: Y
License Server A
State: U
License Server D
State: Z
420F
430F
410F
440F 850
830
First computer system
831
833
Processing circuit
Memory
802
License Server A
851
License Server B
852
License Server C
853
840
Second computer system
841
843
Processing circuit
Memory
860
License server information cache

LICENSE SERVER CACHING FOR CHECKOUT OF FLOATING LICENSES

RELATED APPLICATION

This application claims priority to and the benefit of U.S. Provisional Patent Application No. 63/389,630 "SMART LICENSE SERVER CACHING FOR QUICKER PHYSICAL VERIFICATION LICENSE CHECKOUT" filed on Jul. 15, 2022, the entire disclosure of which is incorporated by reference herein.

TECHNICAL FIELD

The present disclosure relates to license server caching for checkout of floating licenses, and more particularly, the checkout of floating licenses to use executable software.

BACKGROUND

One approach to licensing the use of products, such as computer software, is to require a separate license for each instance of the product (e.g., each copy of the product) that is in use. For example, software licenses can be provided on a per-installation basis, such as where an organization purchases a software license for each copy installed on each computer operated by the organization (e.g., a separate license for each copy of an office productivity suite installed on computers owned by the organization).

A floating licensing or concurrent licensing or network licensing approach provides a limited number of licenses for a software product that can be shared over a larger number of users (e.g., where the number of users is greater than the number of licenses). When a user seeks to use the software product, they request a license from a license server. If such a license is available, the license server checks out that license to the user, thereby preventing other users from checking out that license. When the user has completed their use of the product, the user releases the license to the license server, which then makes that license available to other users. This limits the number of concurrent users to the limited number of purchased licenses.

SUMMARY

According to one embodiment of the present disclosure, a method includes: receiving an input job associated with a license type; receiving a license server order including a plurality of license servers; reading license server information regarding the plurality of license servers from a license server information cache; updating, by a processing device, the license server order based on the license server information to compute an updated license server order; and accessing at least one of the plurality of license servers in the updated license server order to attempt license checkout of a license from one of the plurality of license servers, the license being appropriate for the license type of the input job.

The method may further include writing updated license server information to the license server information cache based on results from the attempted license checkout from one or more of the plurality of license servers. The method may further include: receiving a second input job associated with the license type; receiving a second license server order including one or more of the plurality of license servers; reading the updated license server information regarding the plurality of license servers from the license server information cache; updating the second license server order based on the updated license server information to compute a second updated license server order; and accessing at least one of the plurality of license servers in the second updated license server order to attempt license checkout of a license from one of the plurality of license servers, the license being appropriate for the license type of the input job.

The license server information may include a status of a license server of the plurality of license servers, the status being selected from a group of states including: a known existent license state; a known non-existent license state; an indeterminate state; and a new state.

The updating the license server order may be performed in accordance with: leaving license servers in the new state and license servers in the indeterminate state in place; promoting license servers in the known existent license state ahead of license servers in the indeterminate state up until a license in the new state or a license server in the known existent license state appearing earlier in the license server order; and demoting license servers in the known non-existent license state to the end of the license server order.

The updating the license server order may be performed in accordance with iterating through the plurality of license servers in the license server order, where updating a position of a selected license server of the plurality of license servers includes: in a case where the selected license server is in the indeterminate state, leaving the selected license server in its current position in the updated license server order; in a case where the selected license server is in the new state, leaving the selected license server in its current position in the updated license server order; in a case where the selected license server is in the known existent license state, while a preceding license server in the updated license server order has an indeterminate state, updating the updated license server order by promoting the license server by one position; and in a case where the selected license server is in the known non-existent license state, demoting the selected license server to the end of the updated license server order.

The method may further include writing updated license server information to the license server information cache based on a successful license checkout from a license granting license server of the plurality of license servers, wherein the updated license server information may include setting a status of the license granting license server set to the known existent license state.

According to one embodiment of the present disclosure, a system includes: a license server information cache; a first computer system including: a first memory storing instructions; and a first processor, coupled with the first memory and to execute the instructions, the instructions when executed cause the first processor to: receive a first input job associated with a license type; access at least one of a plurality of license servers to attempt license checkout of a license from one of a plurality of license servers, the license being appropriate for the license type of the first input job; and write updated license server information to the license server information cache based on results from the attempted license checkout from one or more of the plurality of license servers; and a second computer system including: a second memory storing instructions; and a second processor, coupled with the second memory and to execute the instructions, the instructions when executed cause the second processor to: receive a second input job associated with the license type; receive a license server order including the plurality of license servers; read the updated license server information regarding the plurality of license servers from the license server information cache; update the license server order based on the updated license server information to compute an updated license server order; and access at least one of the plurality of license servers in the updated license server order to attempt license checkout of a license from one of the plurality of license servers, the license being appropriate for the license type of the second input job.

The license server information may include a status of a license server of the plurality of license servers, the status being selected from a group of states including: a known existent license state; a known non-existent license state; an indeterminate state; and a new state.

The update of the license server order may be performed in accordance with: leaving license servers in the new state and license servers in the indeterminate state in place in the updated license server order; promoting license servers in the known existent license state ahead of license servers in the indeterminate state up until a license in the new state or a license server in the known existent license state appearing earlier in the updated license server order; and demoting license servers in the known non-existent license state to the end of the updated license server order.

The update of the license server order may be performed in accordance with iterating through the plurality of license servers in the license server order, where updating a position of a selected license server of the plurality of license servers includes: in a case where the selected license server is in the indeterminate state, leaving the selected license server in its current position in the updated license server order; in a case where the selected license server is in the new state, leaving the selected license server in its current position in the updated license server order; in a case where the selected license server is in the known existent license state, while a preceding license server in the updated license server order has an indeterminate state, updating the updated license server order by promoting the license server by one position; and in a case where the selected license server is in the known non-existent license state, demoting the selected license server to the end of the updated license server order.

The instructions stored in the first memory may further include instructions that, when executed, cause the first processor to, in response to a successful license checkout from a license granting license server of the plurality of license servers, write the updated license server information to set the status of the license granting license server to the known existent license state.

The instructions stored in the first memory may further include instructions that, when executed, cause the first processor to, in response to a failed license checkout from a new license server in the new state, write the updated license server information to set the status of the new license server to the indeterminate state.

According to one embodiment of the present disclosure, a non-transitory computer-readable medium including stored instructions, which when executed by a processor, cause the processor to: receive an input job associated with a license type; receive a license server order including a plurality of license servers; read license server information regarding the plurality of license servers from a license server information cache; update, by the processor, the license server order based on the license server information to compute an updated license server order; and access at least one of the plurality of license servers in the updated license server order to attempt license checkout of a license from one of the plurality of license servers, the license being appropriate for the license type of the input job.

The non-transitory computer-readable medium may further include stored instructions, which when executed by a processor, cause the processor to write updated license server information to the license server information cache based on results from the attempted license checkout from one or more of the plurality of license servers.

The non-transitory computer-readable medium may further include stored instructions, which when executed by a processor, cause the processor to: receive a second input job associated with the license type; receive a second license server order including one or more of the plurality of license servers; read the updated license server information regarding the plurality of license servers from the license server information cache; update the second license server order based on the updated license server information to compute a second updated license server order; and access at least one of the plurality of license servers in the second updated license server order to attempt license checkout of a license from one of the plurality of license servers, the license being appropriate for the license type of the input job.

The license server information may include a status of a license server of the plurality of license servers, the status being selected from a group of states including: a known existent license state; a known non-existent license state; an indeterminate state; and a new state.

The instructions to update the license server order may perform the update in accordance with: leaving license servers in the new state and license servers in the indeterminate state in place; promoting license servers in the known existent license state ahead of license servers in the indeterminate state up until a license in the new state or a license server in the known existent license state appearing earlier in the license server order; and demoting license servers in the known non-existent license state to the end of the license server order.

The instructions to update the license server order may perform the update by iterating through the plurality of license servers in the license server order, where updating a position of a selected license server of the plurality of license servers may include: in a case where the selected license server is in the indeterminate state, leaving the selected license server in its current position in the updated license server order; in a case where the selected license server is in the new state, leaving the selected license server in its current position in the updated license server order; in a case where the selected license server is in the known existent license state, while a preceding license server in the updated license server order has an indeterminate state, updating the updated license server order by promoting the license server by one position; and in a case where the selected license server is in the known non-existent license state, demoting the selected license server to the end of the updated license server order.

The non-transitory computer-readable medium may further include stored instructions, which when executed by a processor, cause the processor to write updated license server information to the license server information cache based on a successful license checkout from a license granting license server of the plurality of license servers, wherein the updated license server information may include a status of the license granting license server set to the known existent license state.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 4A, 4B, 4C, 4D, 4E, and 4F are schematic depictions of changes in the cached states of license servers over time according to one embodiment of the present disclosure.

DETAILED DESCRIPTION

Figure 1:
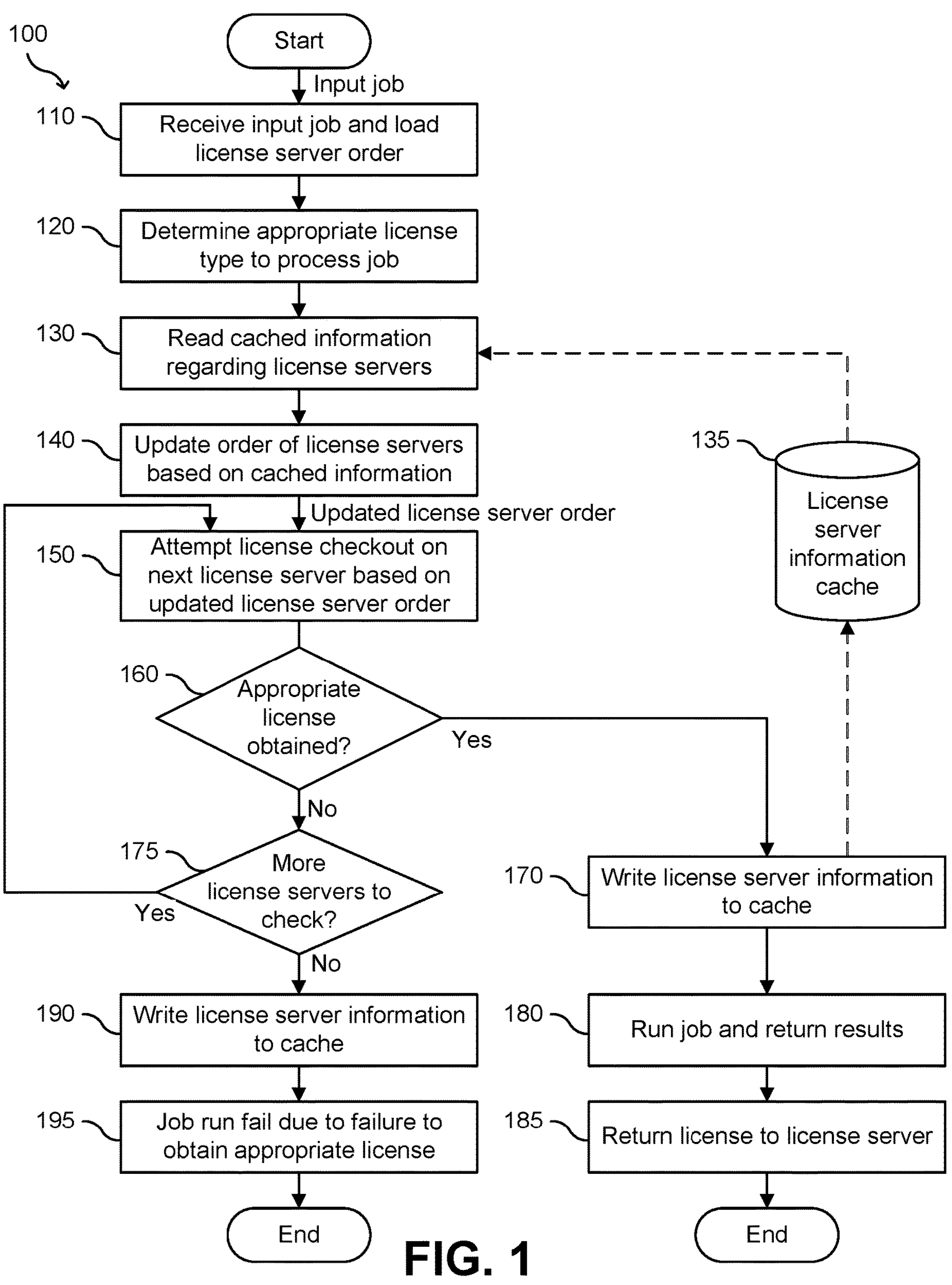
FIG. 1 is a flowchart of a method for checking out a floating license from a license server using an ordering set based on cached information according to one embodiment of the present disclosure.

Aspects of the present disclosure relate to license server caching for checkout of floating licenses. One example of an environment that may use floating licenses is a workflow for designing an integrated circuit (IC). Different stages of a workflow for designing integrated circuits may use different software products (an example of such a workflow is discussed below with respect to FIG. 6). A user may create a job to be run by the software product (e.g., as a batch process), where the job provides some input corresponding to a given stage of the workflow (e.g., code in a hardware description language in the case of a synthesis stage of the workflow, a netlist describing an integrated circuit design in the case of a design planning stage of the workflow, or a layout of an integrated circuit design in the case of a physical verification stage of the workflow). The software product may produce some output after running the job, such as verification results in case where the software product is a physical verification product or transformations of the input (e.g., computing placements of circuit components or standard cells of the design and routing of connections between the standard cells) in a case where the software product is a placement and routing product.

When a user attempts to run a job for a particular stage of the workflow that makes use of such a software product that is licensed on a floating basis, the software product (or a client thereof) attempts to acquires an appropriate license from a license server before it runs its job (e.g., a physical verification job in the case of a software product for performing physical verification of an integrated circuit design). In some environments, multiple license servers manage floating licenses available to the various software products. Each license server may be a computer system, e.g., a physical computer system or a virtualized computer system implementing a software application that provides an application programming interface for clients to check out software licenses and for clients to return checked-out licenses to license server. Each license server holds (or contains or manages) a limited number of licenses that are shared among authorized users (e.g., members of an organization that has obtained these licenses). In some embodiments, there are multiple types of licenses and a given license server may manage only a single type of license or multiple types of licenses. For example, some licenses may relate to only single software products (e.g., only for physical verification). Other licenses may relate to groups of products. Some licenses may have restrictions such as providing access to only a subset of the features of a software product (e.g., only performing a subset of all possible design rule checks, such as only design rule checks associated with a particular semiconductor fabrication technology node) or limiting the maximum number of processing cores or maximum amount of memory of a computer system (or cluster of computer systems) that will be used by a software product executed when using such a restricted license.

In some systems, the software product searches through an ordered list of license servers to obtain an appropriate license (e.g., a license file), where a license is appropriate when it allows the job to be run (e.g., depending on the size of the input or the software features required to execute the job). The ordered list of license servers may be provided by the user or the organization managing the license servers (e.g., a system administrator). During this search for an appropriate license, a software product queries each of the license servers to request an appropriate license. In response to this query, a license server may allow the software product to check out an appropriate license or may fail to provide a license because the license server does not have an appropriate license for the software product or because all the appropriate licenses managed by that license server are in use at that time. In such a case, the software product may proceed by accessing the remaining license servers in the ordered list, one at a time, until a license is successfully obtained or until the software product has tried each of the license servers in the ordered list, in which case the job may fail to run because a license could not be checked out. This process of iterating through the ordered list of license servers in search of an appropriate license may take several minutes to run, depending on the number of license servers that need to be queried before successfully obtaining a license and bandwidth of the computer network between the license servers and the computers that run or execute the jobs, such as when the license servers are scattered around the world.

Different types of jobs may run for various amounts of time, depending on the complexity of the work performed by the software product and the size of the input (e.g., the size of the integrated circuit design). For example, some jobs may run in under a second and other jobs may run for hours or days. Jobs that run quickly may be executed more often. For example, some physical verification software may complete jobs in a few seconds or less-a user may repeatedly run a physical verification job on a small integrated circuit design as the user makes minor changes to the IC design correct errors or warnings reported by the physical verification software product. The potentially long delay (e.g., minutes) in searching for an appropriate software license to run a job can therefore dominate the time needed to run short jobs (e.g., minutes of time searching for a license compared to seconds of time running the job). This reduces user productivity and increases user frustration, because the user must wait a long time for the software product to obtain an appropriate floating license for the job to be run, and the user much wait each time they run such a job.

Aspects of embodiments of the present disclosure relate to caching (e.g., storing) information about licenses available on license servers and modifying the order in which the license servers are checked based on the cached information. In some embodiments, when a software product fails to obtain a license from a given license server, that license server is moved backward (or demoted) in the ordered list, while a successful checkout of a license from a license server causes that license server to move forward (or promoted) in the ordered list. The collected information may be stored (cached) and made available for subsequent different runs of the software product on different jobs, where the information may then be used to compute a new ordering of the license servers based on the cached information. In some embodiments, the cached information is shared between different software products and/or different computer systems, such that different users may benefit from the cached information regarding the license servers. Using the cached information regarding the license servers to set the order in which license servers are queried for licenses shortens the amount of time to check out a license in subsequent jobs because license servers that are more likely to have the appropriate licenses available are searched first (earlier in the ordered list) than license servers that appear to be less likely to have the required licenses.

Technical advantages of the present disclosure include, but are not limited to, shortening the total time for running a job by shortening the portion of the total time that is consumed by checking out floating licenses to the software to run the job and reducing the amount of network traffic involved in searching for an appropriate floating license from the license servers. Embodiments of the present disclosure solve a problem arising from computer technology, namely reducing delays caused by software license checkout procedures and thereby improving the speed (e.g., reducing the turnaround time) of job runs.

While some aspects of embodiments of the present disclosure are discussed herein in the context of floating licenses for software products in the field of workflows for designing integrated circuits, embodiments of the present disclosure are not limited thereto and may also be applied to other types of products that may use floating licenses managed by a plurality of license servers.

FIG. 1 is a flowchart of a method 100 for checking out a floating license from a license server using an ordering set based on cached information according to one embodiment of the present disclosure. In some embodiments, the method is implemented on a processing device (or processing circuit) and memory of a computer system such as the computer system described below with respect to FIG. 7. The memory may store instructions implementing the method, and the method may be a component of a software product (e.g., a function or procedure or library for obtaining appropriate software licenses for the software product) or may be a separate software configured to obtain software licenses for running a separate software product (e.g., by storing a file or other data in a memory of the computer system in a manner that is accessible to the software product that requires a license).

At 110, the processing device of the computer system receives an input job and loads an initial license server order. The initial ordering of license servers may be specified by a user or by an organization, such as by being stored in a file or in an environment variable of the computer system. In some embodiments, each of the license servers is associated with an address, such as an internet protocol address (IP address), a uniform resource identifier (URI), or a domain name (e.g., a fully qualified domain name or a relative domain name).

At 120, the processing device determines an appropriate license type (or requirements associated with a license) to process the input job. As noted above, different types of jobs may require different types licenses based on, for example, the software product or products that will be used in the course of executing the job (or specific required features thereof), the size of the job (e.g., memory requirements), the computational requirements of the job (e.g., number of processors), the geographic region in which the job is to be run (e.g., in compliance with technology export controls), and the like. For example, the various types of licenses may be arranged into multiple tiers, where lower-tiered licenses provide access to less functionality than higher-tiered licenses, in which case an appropriate license would be any license having sufficiently high tier to execute the job.

At 130, the processing device reads cached information regarding license servers. This information can be read from a license server information cache 135. In some embodiments, this license server information cache 135 is centrally stored (e.g., in a database accessible over a network). In some embodiments, this information is stored in a memory of the computer system (e.g., in persistent storage) or combinations thereof (e.g., local copies and network copies of the cached license server information).

In some embodiments, the processing device reads information from the license server information cache. The license server information cache, in some embodiments, includes: a server name (e.g., an identifier such as: a network address in the form of an IP address or a domain name; a URI; a universally unique identifier; a hash; or the like); a license feature name (e.g., a license feature or license type that was queried for when the information for this cache entry was obtained); a license existence status (discussed below); and a timestamp corresponding to when the information was obtained.

Because the license server information cache may include server information that may not be relevant to the licenses for processing the job (and may include information for servers that are not accessible for the job), in some embodiments the processing device queries the license server information cache for entries that are among the servers specified in the ordered list of license servers loaded at 110 that have the license features that were determined to be applicable at 120, and where the cached entries are still within a valid time period (e.g., fresh cache information or non-expired cache information).

When the processing device attempts, at 150, to check out a license feature from a license server, it can then determine, at 160, whether an appropriate license was obtained (e.g., based on whether the computing device was able to successfully heck out a license from the server). If the computing device was able to obtain an appropriate license, then it will obtain information which will be written, at 170, to the license server information cache. For a given pairing of a license server and a license feature, the processing device will obtain information regarding the existence of that license feature, where this may be referred to as a license existence status (whether license server has a license with the license feature). Because the processing device will only check as many license servers as needed until an appropriate license is obtained, license servers that appear after a license server provides the needed license will not be queried, and therefore the license existence status of those other servers will not be determined. In some embodiments, the license server responding to the request or query for a license may not distinguish between a case where the license server does not hold or possess the requested license type and a case where the license possesses the requested license type, but no such licenses are available because all copies of that requested license type are currently checked out.

In some embodiments, the license server information cache tracks four possible states of the license servers corresponding to three possible explicit license existence statuses and a fourth state corresponding to a case where the license server has never been checked for a particular license type (e.g., newly added to the list of servers):

License known to exist (state Y)

License known to not exist (state N)

Indeterminate if license exists (state U)

New (not attempted, no cache entry) (state Z)

The conditions for setting different ones of the four states will be described in more detail below.

Table 1 shows an example of some of the information stored in a license server information cache:

TABLE 1

| Server address | Feature name | License existence status | Timestamp |
|---|---|---|---|
| Licserver1.domain.com | LicenseFeatureABC | Non-existent | Jan. 1, 2022 17:34:03 |
| Licserver2.domain.com | LicenseFeatureABC | Indeterminate | Jan. 1, 2022 16:00:00 |
| Licserver3.domain.com | LicenseFeatureABC | Existent | Jan. 1, 2022 17:35:00 |
| Licserver3.domain.com | LicenseFeatureXYZ | Existent | Jan. 2, 2022 06:00:00 |

At 140, the processing device updates the order of license servers based on the cached information regarding the license servers that was read from the license server information cache.

Figure 2:
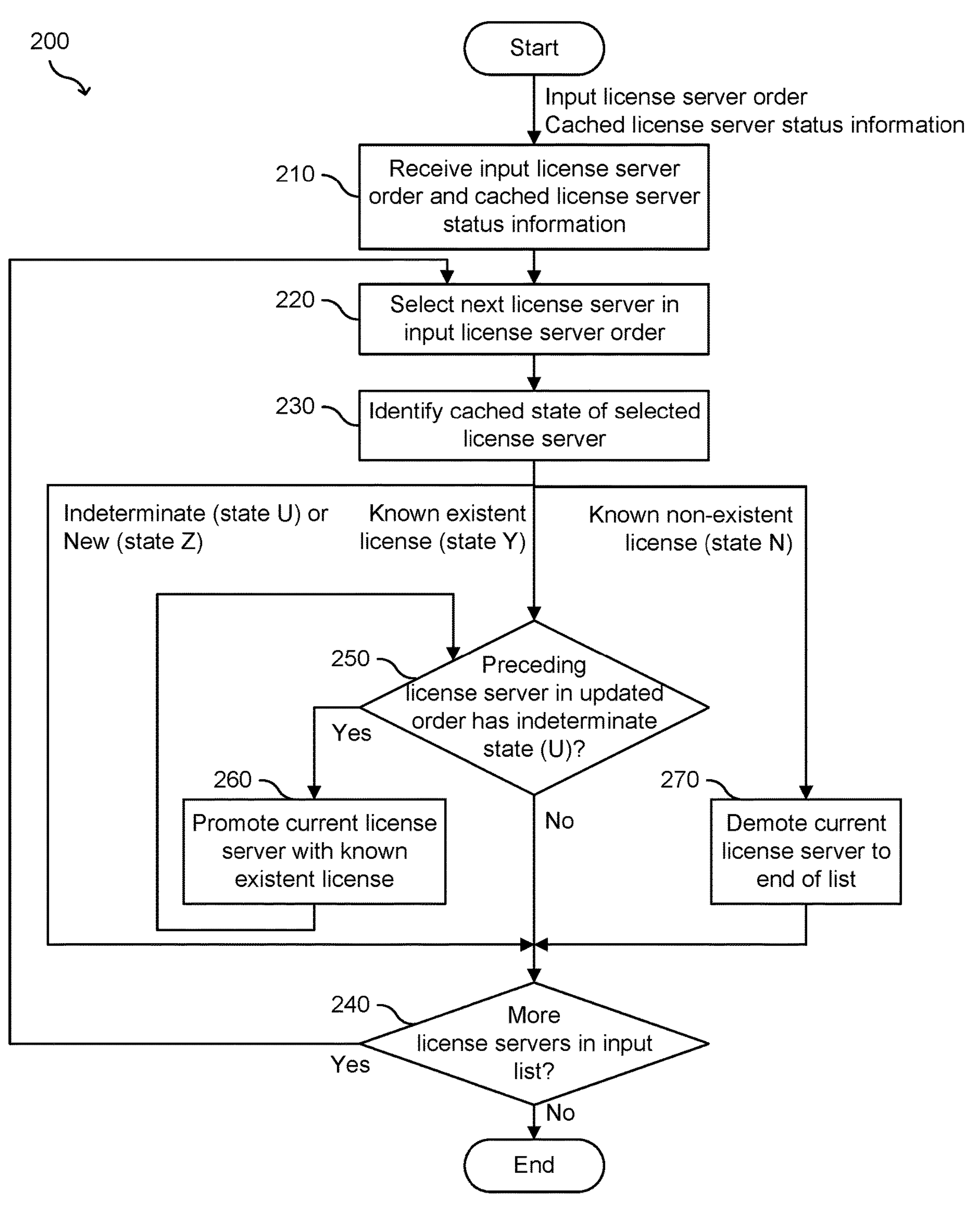
FIG. 2 is a flowchart of a method for reordering license servers based on cached license server data according to one embodiment of the present disclosure.

FIG. 2 is a flowchart of a method 200 for reordering license servers based on cached license server data according to one embodiment of the present disclosure. At 210 the processing device receives an input license server order (e.g., the order loaded at 110) and cached license server status information regarding the servers in the input license server order (e.g., the data read at 130).

In the embodiment shown in FIG. 2, the method 200 considers the license servers in the given input ordered list of license servers, one license server at a time, based on their original order in the input license server order. Accordingly, at 220, the method selects a next license server in the input license server order and, at 230, identifies the cached status of the selected license server. The processing device then takes different actions depending on the state of the license server.

Figures 3A, 3B, 3C:
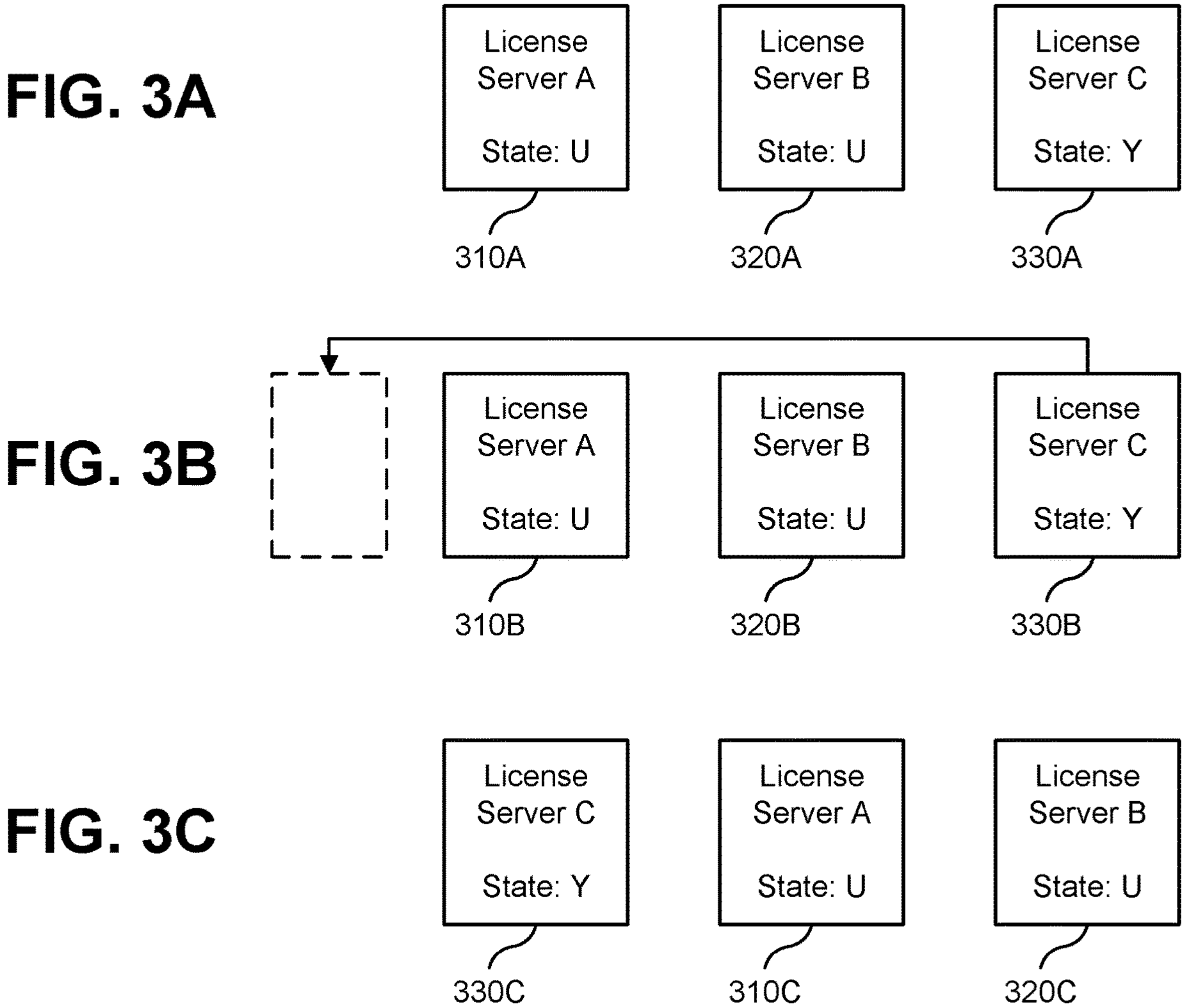
FIGS. 3A, 3B, and 3C are schematic diagrams illustrating a reordering of license servers according to one embodiment of the present disclosure.

FIGS. 3A, 3B, and 3C are schematic diagrams illustrating a reordering of license servers according to one embodiment of the present disclosure. As shown in FIG. 3A, the initial input license server order was License Server A 310A, License Server B 320A, followed by License Server C 330A. The cached license server status information (as determined from previous attempts to checkout licenses from these license servers) was:

License Server A 310A—indeterminate (state U)

License Server B 320A—indeterminate (state U)

License Server C 330A—known existent license (state Y)

Referring to the method shown in FIG. 2, the processing device iterates through the license servers in the order shown in FIG. 3A (License Server A 310A, then License Server B 320A, followed by License Server C 330A). As such, License Server A 310A is selected first. Because it has a state of indeterminate (state U), the processing device does not change the position of this license server and proceeds, at 240, with determining if there are more license servers in the initial ordered list. Because there are still two more license servers in the list, the processing device proceeds with selecting the next license server, License Server B 320A at 220, which also has a state of indeterminate (state U), so License Server B 320A is also skipped over and License Server C 330A is selected at 220.

Here, because License Server C 330A has a state of known existent license (state Y) indicating that an applicable license was previously successfully retrieved from this license server, the license server is promoted within the updated ordering. In particular, as shown in FIG. 2, the processing device determines, at 250, if the preceding licensing server in the updated order of license servers has an indeterminate state (state U). Here, License Server B 320A has indeterminate state, so at 260 the processing device promotes License Server C 330A ahead of License Server B 320A.

After updating the order by promoting License Server C 330A ahead of License Server B 320A, the processing device determines, at 250, whether the preceding license server has an indeterminate state (state U). License Server A 310A also has indeterminate state (state U), so at 260, the processing device promotes License Server C 330A ahead of License Server A 310A.

After updating the order by promoting License Server C 330A ahead of License Server A 310A, the processing device determines, at 250, whether the preceding license server has an indeterminate state (state U). Because License Server C 330A is now at the front of the ordered list of license servers, there are no additional license servers to check, so the processing device leaves License Server C 330A at its updated position at the front of the ordered list of license servers. FIG. 3B shows, with an arrow, the promotion of License Server C 330B ahead of License Server A 310B and License Server B 320B.

At 240, the processing device determines if there are more license servers in the input list. Because License Server C 330A is the last server in the input license server order, the reordering of the license servers is complete. FIG. 3C illustrates the updated order of license servers as License Server C 330C, then License Server A 310C, followed by License Server B 320C. Note that the relative ordering of License Server A 310C with respect to License Server B 320C remains the same as in the original ordering (License Server A 310C is still ahead of License Server B 320C).

FIGS. 4A, 4B, 4C, 4D, 4E, and 4F are schematic depictions of changes in the cached states of license servers over time according to one embodiment of the present disclosure.

In some embodiments, initially, before any information has been cached or when all of the cached information has expired, all license servers have a state of new or state Z. For example, FIG. 4A is a schematic depiction of an ordered list of four license servers (License Server A 410A, License Server B 420A, License Server C 430A, and License Server D 440A), where there is no cached information regarding the status or states of the four license servers and therefore each of these license servers has a state of new (state Z). In a case where all of the servers in the list of license servers has a state of new, the order of the license servers is left unchanged.

Referring back to FIG. 1, at 150, the processing device attempts a license checkout on the first license server in the ordered list, License Server A 410A and, at 160, determines that no appropriate license was obtained. As noted above, in a case where an appropriate license was obtained, then, at 170, the processing device writes the license server information to the license server information cache 135. Assuming that the processing device fails to obtain a license from the first server, in some embodiments, the processing device writes information identifying License Server A 410A as having a state of indeterminate (state U) because the response from the License Server A 410A does not indicate whether it had no license of the appropriate type or if all of the appropriate licenses were checked out at the time of the request.

Every time a job attempts to check out a license feature from a license server, it will obtain information which may be written to the cache. For a given license server and license feature (or license type) pairing, the corresponding info stored contains the existence status and time stamp. This information will replace existing cache information in the license server information cache 135 except that an indeterminate status (state U) will not replace an entry with a known existent license status (state Y) and will not replace an entry with a known non-existent license status (state N).

At 160, the processing device determines that no appropriate license was obtained and, at 175, determines that there are more license servers to check, and proceeds with License Server B 420A, at 150.

Assuming that License Server B 420A also did not provide an appropriate license, the processing device writes corresponding information to the license server information cache 135 and the processing device proceeds with attempting a license checkout from License Server C 430A. Assuming that License Server C 430A returns an appropriate floating license to execute the input job, the license server information cache 135 is also updated with information about the existence of the license on License Server C 430A. The processing device then determines, at 170, that an appropriate license was obtained (from License Server C 430A) and proceeds to run the job, at 180, and return the results of the job. After running the job, at 185, the processing device releases or returns the license to the license server (checks-in the license) such that the license can be checked out for running another job. Because License Server D 440A was not queried for a license, no additional information is written to the license server information cache 135 regarding License Server D 440A.

FIG. 4B illustrates the states of the license servers as retrieved from the license server information cache 135 during a subsequent run of a job requiring the same license type and using the same ordered list of license servers. During this subsequent run, at 130, the processing device reads the cached information that was stored in the license server information cache 135. Due to the writing of information during a prior run (described above), License Server A 410B and License Server B 420B both has a state of indeterminate (state U), License Server C 430B has a state of known existent license (state Y), and License Server D 440B has a state of new (state Z).

Accordingly, given this cached license server state information, at 140, the processing device updates the order of the license servers to promote License Server C 430B (having state Y) ahead of License Server A 410B and License Server B 420B (having state U), such as by applying the method 200 shown in FIG. 2, as shown in FIG. 4C, which depicts a license server order of: License Server C 430C (having state Y); License Server A 410C (having state U); License Server B 420C (having state U), and License Server D 440C (having state Z).

Accordingly, when attempting a license checkout at 150, the processing device starts with a license server that is known to previously have successfully provided an appropriate license in response to a request for a particular license type for the input job. This reduces the time needed to check out a license because, for example, License Server A 410C and License Server B 420C (both having state U), from which the processing device was not able to obtain an appropriate license, are checked later in the order or sequence of license servers.

As time passes, additional jobs may be run, and these jobs may use the same cached license server status information retrieved from the license server information cache 135, and therefore the processing circuits executing these jobs will check the license servers in the order shown in FIG. 4C. Assuming License Server C 430C provides the requested licenses for these additional jobs during each request, this refreshes the cached information relating to License Server C and leaves License Server A 410C, License Server B 420C, and License Server D 440C unchecked.

In some embodiments, after a specified timeout or cache expiration period, the cached information showing statuses of indeterminate (state U) for License Server A 410C and License Server B 420C is removed or expired. The timeout may be, for example, 8 hours, 24 hours, or the like. The expiration of the cached information resets the states of these license servers to new (state Z). On the other hand, the successful retrievals of licenses from License Server C 430C during this period keeps the information in the license server information cache 135 fresh (e.g., updates the timestamp in the cache for License Server C 430C).

As such, during a first run of a job after expiration of the cached entries for License Server A 410C and License Server B 420C, the retrieved information for License Server A 410C and License Server B 420C will show that both are in a state of new (state Z). Accordingly, when the processing device reorders the license servers based on this information at 140, the order does not change because, as shown in FIG. 2, a license server with a state of known existent license (state Y) is only promoted above license servers with an indeterminate state (state U) but not license servers with a state of new (state Z). FIG. 4D illustrates the states and order of servers during a first run of a job after expiration of the cached information for License Server A 410D and License Server B 420D.

Figures 4E, 4F:
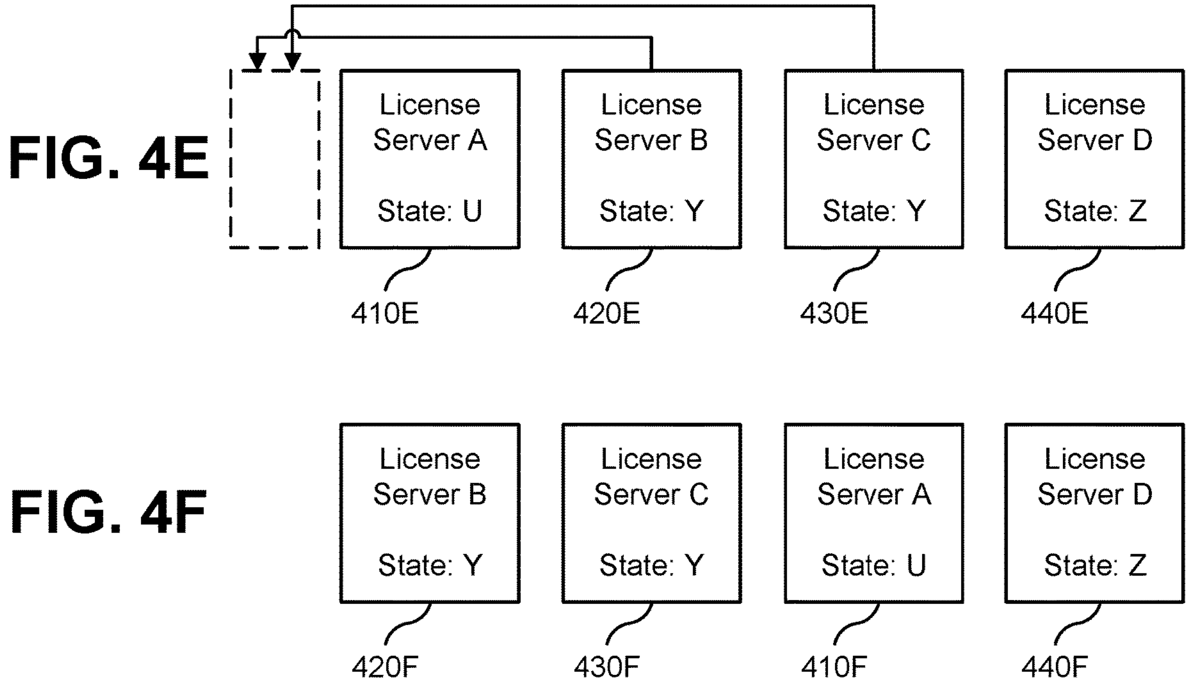

During this run, the processing device may find that License Server A 410D does not provide the requested license but License Server B 420D does provide an appropriate license. This results in the license server information cache 135 being updated to show a state of indeterminate (state U) for License Server A 410D and a state of known existent license (state Y) for License Server B 420D. FIG. 4E is a schematic depiction of the states of the license servers after updating the cached information in this way, where License Server A 410E has an indeterminate state (state U), License Server B 420E and License Server C 430E both have a known existent license state (state Y), and License Server D 440E has a new state (state Z). When the license servers are reordered based on this state information, License Server B 420E and License Server C 430E are both promoted ahead of License Server A 410E.

FIG. 4F is a schematic depiction of a reordering of the license servers based on the cached license server information shown in FIG. 4E. In this reordering, License Server B 420F and License Server C 430F (having states Y) are moved to the start of the ordering of license servers, in front of License Server A 410F (having state U), and License Server D 440F having state Z is left in place.

In some circumstances, the processing device iterates through all of the license servers and fails to obtain a license from any of the license servers in the loaded license server order. In such circumstances, the processing device may determine, at 175, that there are no additional license servers to check for an available license and, at 190, writes the obtained license server information to the cache (e.g., identifying the states of the servers as indeterminate or known non-existent), and, at 195, returns that the input job failed to run due to an inability to obtain an appropriate license to run the job.

Figures 5A, 5B, 5C:
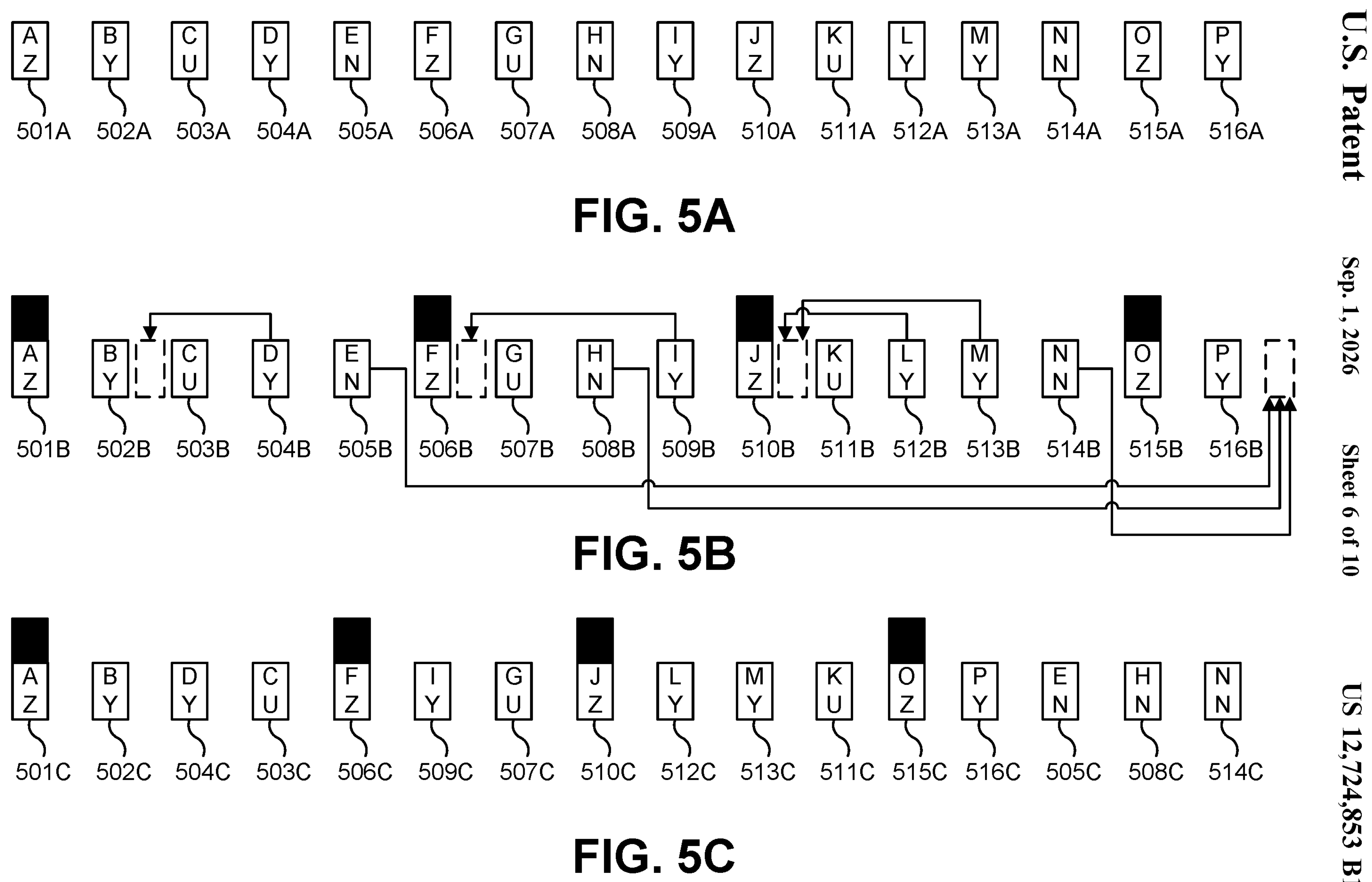
FIGS. 5A, 5B, 5C, 5D, and 5E are schematic depictions of changes in the cached states of license servers over time according to one embodiment of the present disclosure.

FIG. 5A is a schematic depiction of an example of an input ordered list of 16 license servers and associated cached license server information, where the cached license server information includes license servers having a states of: known non-existent license (state N); known existent license (state Y); indeterminate (state U); and new (state Z) according to one embodiment of the present disclosure. The sixteen license servers include License Server A 501A through License Server P 516A.

FIG. 5B illustrates the reordering of the license servers that would be applied at 140 of the method 100 of FIG. 1, such as in accordance with the method 200 shown in FIG. 2. License Server B 502B cannot be promoted past License Server A 501B in the new state (state Z), as indicated by the shaded block on top of License Server A 501B. License Server C 503B remains in place because its status is indeterminate (state U). License Server D is promoted past License Server C 503B, but not past License Server B 502B.

As shown in FIG. 5B, License Server E 505B is in the known non-existent license state (state N). Accordingly, at 270, the processor demotes License Server E 505B to the end of the list.

License Server F 506B remains in place because its status is new (state Z), and License Server G 507B remains in place because its status is indeterminate (state U). License Server H 508B has a state of known non-existent license (state N) and therefore is also moved to the end of the list (because the processing device analyzed License Server H 508B after License Server E 505B, License Server H 508B is placed after License Server E 505B at the end of the list, thereby preserving their original order relative to one another). License Server I 509B is promoted past License Server G 507B having state U, but not past License Server F 506B having state Z.

License Server J 510B remains in place because its status is new (state Z), and License Server K 511B remains in place because its status is indeterminate (state U). License Server L 512B and License Server M 513B both have state Y and therefore are promoted in front of License Server K 511B having state U, but not past License Server J 510B having state Z. License Server N 514B is demoted to the end of the list.

License Server O 515B remains in place because its status is new (state Z), and License Server P 516B in state Y connect be promoted past License Server O 515B.

FIG. 5C shows the reordered list of license servers (e.g., reordered based on the method 200 shown in FIG. 2) based on the promotions and demotions indicated in FIG. 5B, where the new order is License Server A 501C, License Server B 502C, License Server D 504C, License Server C 503C, License Server F 506C, License Server I 509C, License Server G 507C, License Server J 510C, License Server L 512C, License Server M 513C, License Server K 511C, License Server O 515C, License Server P 516C, License Server E 505C, License Server H 508C, and License Server N 514C.

As additional jobs are run, queries are sent to the new license servers, such as License Server A 501C, License Server F 506C, License Server J 510C, and License Server O 515C, such that the cached status of these license servers may be updated from new (state Z) to some other state.

Figures 5D, 5E:
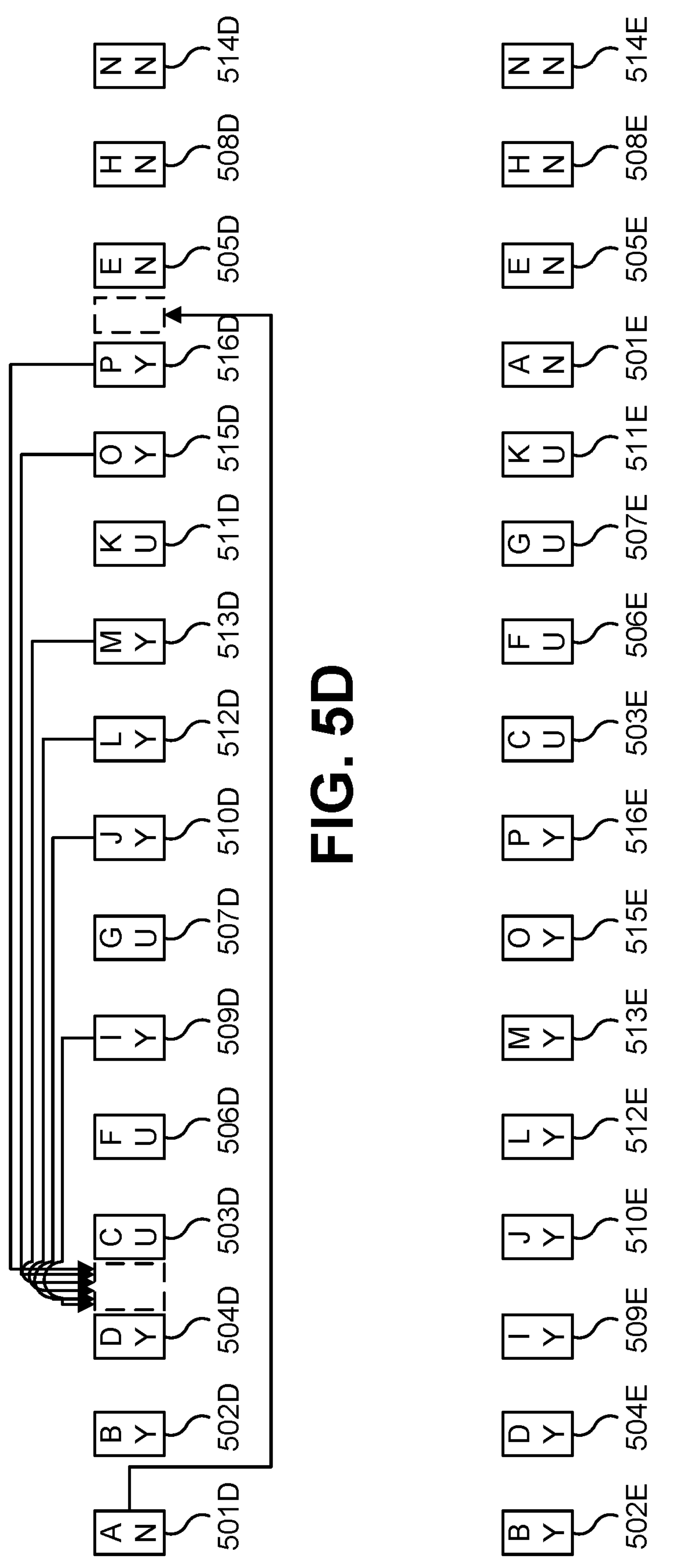

FIG. 5D depicts one example of a progression of the states of the license servers shown in FIG. 5C according to one embodiment of the present disclosure. In the example of FIG. 5D, License Server A 501D was updated to be in the known non-existent license state (state N), License Server F 506C was updated to be in the indeterminate state (state U), and License Server J 510C and License Server O 515C were both updated to be in the known existent license state (state Y). This results in the License Server A 501D being demoted to the end of the ordered list, while preserving the relative order of the license servers among the other license servers in state N. In addition, because there are no more license servers in the new state remaining in the list of license servers, all of the license servers in the known existent license state (state Y) are promoted to the beginning of the ordered list (while preserving their original relative order).

FIG. 5E depicts the updated list after performing the promotions and demotion shown in FIG. 5D, where the new order is License Server B 502E, License Server D 504E, License Server I 509E, License Server J 510E, License Server L 512E, License Server M 513E, License Server O 515E, License Server P 516E, License Server C 503E, License Server F 506E, License Server G 507E, License Server K 511E, License Server A 501E, License Server E 505E, License Server H 508E, and License Server N 514C.

As shown in FIG. 5E, the reordering collects the license servers having known existent licenses at the start of the ordered list, collects the license servers having known non-existent licenses at the end of the ordered list, and leaves the license servers having indeterminate state in between. This therefore arranges the license servers in order from most likely to have an appropriate license to least likely to have an appropriate license, thereby reducing the average time to find a server than possesses an appropriate license for the job, while also allowing for all of the license servers to be queried (e.g., such that the updated ordering still checks all of the license servers that were originally specified by the user or the organization).

While FIG. 2 depicts one method 200 for reordering license servers based on the cached license server status information, embodiments of the present disclosure are not limited to the methods shown in FIG. 2. Some aspects of embodiments of the present disclosure relate to reordering of license servers in accordance with the following rules:

License servers with a status of new (state Z) maintain their spot in the order of license servers and block other license servers from being promoted ahead of them. New license servers keep their position as defined in the input order until accessed to retrieve a floating license and information is learned about that license server and stored in the license server information cache 135. No other license servers can be reordered to move in front of a license server having a new state (state Z).

License servers with indeterminate status (state U) maintain their position in the order of license servers.

License servers with known existent license status (state Y) are promoted in front of license servers with indeterminate status (state U), keeping their relative order (e.g., with respect to other license servers in state Y). License servers with known existent license status (state Y) cannot move ahead of license servers with new status (state Z).

License servers with known non-existent license status (state N) are demoted to the very end of the ordered list of license servers, keeping their relative order (e.g., relative to other license servers with state N), including being demoted past license servers with new status (state Z).

In addition, some of the embodiments described above assume that the license servers do not return information distinguishing between a case where the license server does not possess any licenses of the requested type and a case where the license server does possess at least one license of the requested type, but all such licenses are currently checked out. However, embodiments of the present disclosure are not limited thereto. In a case where the server does provide such information, then license servers that respond that they do not posses any licenses of the requested type are marked as known non-existent license (state N) for the given license type. In a case where the license server responds that all such licenses are checked out, then, in some embodiments, that license server is marked as known existent license (state Y) and in other embodiments, the server is masked as indeterminate (state U) such that other servers that may have a lower demand for those licenses are queried before this license server.

Accordingly, aspects of embodiments of the present disclosure relate to methods for reducing the amount of time spent in checking out a floating license from a license server by dynamically updating the order in which license servers are queried for licenses in accordance with cached information regarding the status of the license server, as collected from prior queries sent to the license servers. This reduces the total turnaround time for running a job that requires obtaining a floating license for execution, thereby solving or reducing a problem arising from the technology of dynamically allocating floating licenses on a per-job basis.

Figure 6:
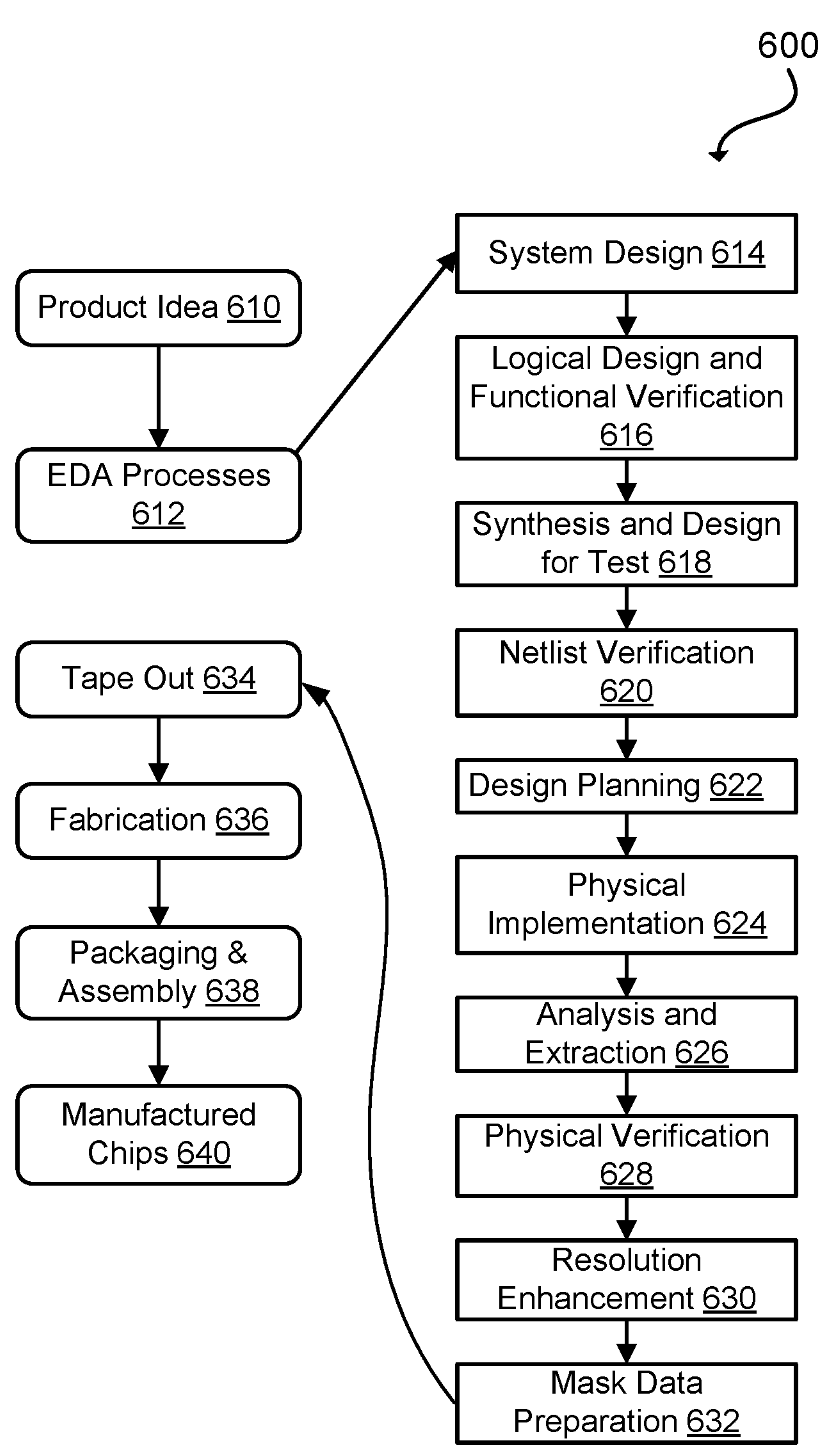
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 6. The processes described by FIG. 6 may be enabled by EDA products (or EDA systems).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

Figure 7:
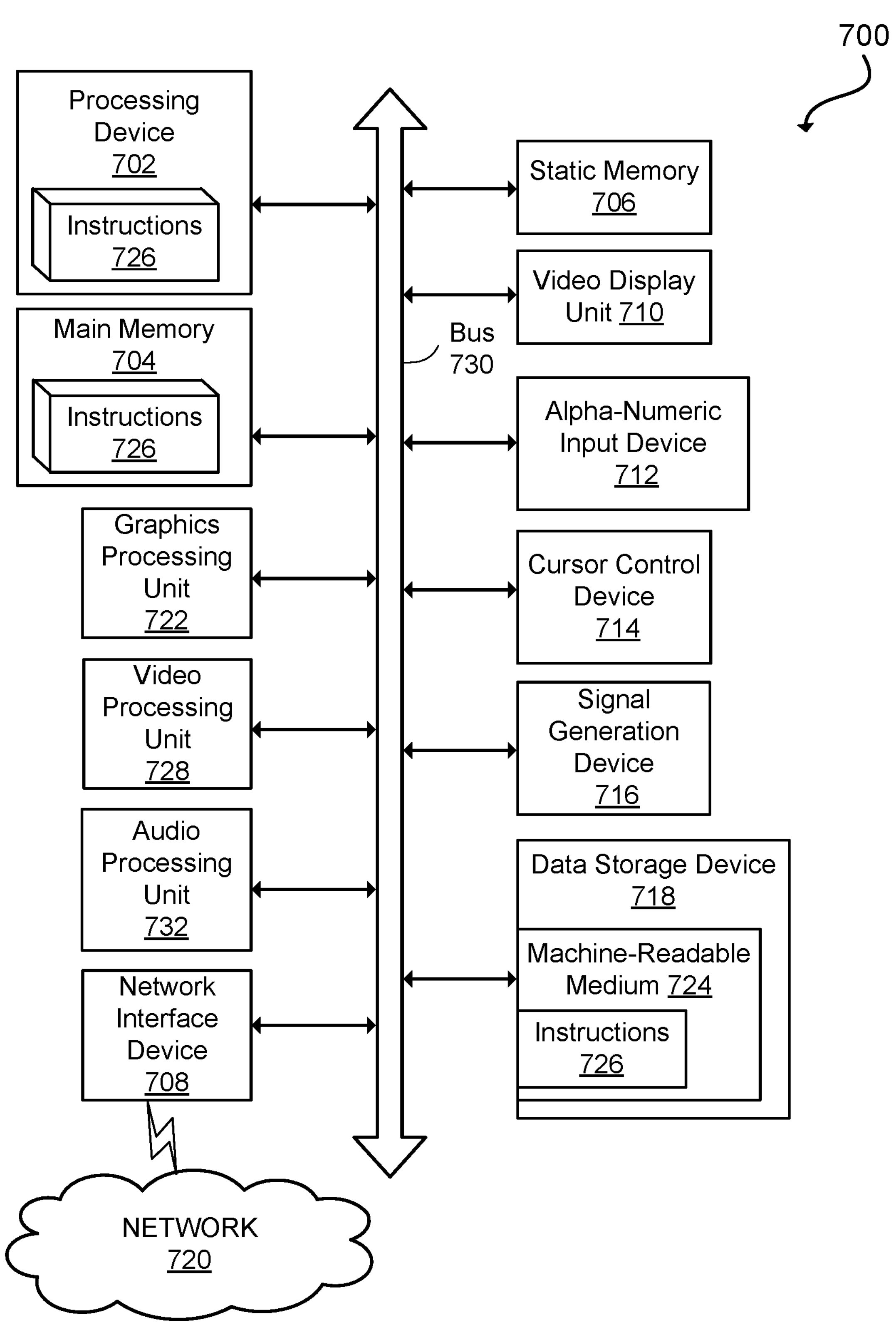
FIG. 7 depicts a diagram of an example computer system in which embodiments of the present disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random-access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Figures 8A, 8B:
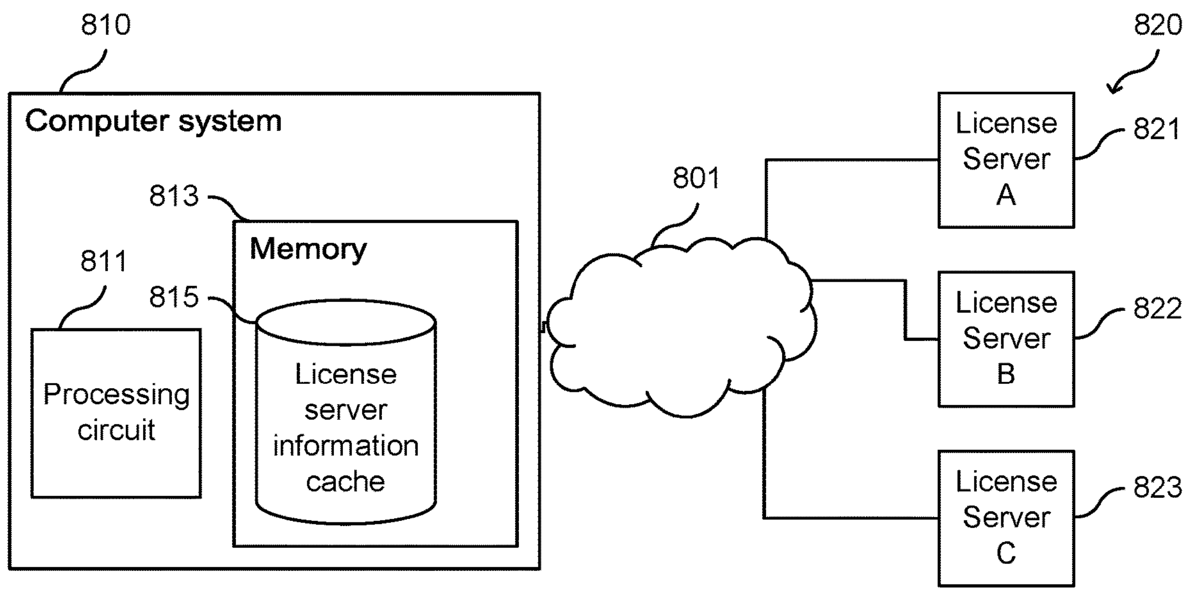
FIGS. 8A and 8B depict examples of arrangements and communications between processing circuits attempting to check out floating licenses and license server caches managing floating licenses according to one embodiment of the present disclosure.

FIGS. 8A and 8B depict examples of arrangements and communications between processing circuits attempting to check out floating licenses and license server caches managing floating licenses according to one embodiment of the present disclosure.

As shown in FIG. 8A, a computer system 810 including a processing device 811 and memory 813 (e.g., persistent memory or static memory such as flash memory or dynamic memory such as DRAM), where the memory 813 stores a license server information cache 815 (e.g., implemented as a database running on the computer system 810). The computer system 810 may be implement using, for example, a computer system 700 described above with respect to FIG. 7. When the processing device 811 attempts to obtain a floating license from one of the license servers 820 (including License Server A 821, License Server B 822, and License Server C 823) over a network 801, the processing device 811 may access cached license server information stored in the local license server information cache 815 and use the retrieved information for updating the order in which the license servers 820 are queried according to embodiments of the present disclosure as discussed above. While attempting to checkout licenses from each of the license servers 820, the processing device 811 obtains information from that license server (e.g., successful license checkouts versus failures in obtaining licenses) and stores the information in the license server information cache 815. This stored information may be used in subsequent attempts to obtain floating licenses (e.g., floating licenses of the same type as previously requested) from the license servers 820, such as by first attempting to obtain licenses from license servers 820 that have previously successfully provided appropriate licenses.

FIG. 8B depicts an embodiment of the present disclosure where the license server information cache is centrally stored in a separate database outside of an individual computer system. As shown in FIG. 8B, a first computer system 830 includes a processing device 831 and memory 833 (e.g., persistent memory or static memory such as flash memory or dynamic memory such as DRAM). Likewise, a second computer system 840 includes a processing device 841 and memory 843 (e.g., persistent memory or static memory such as flash memory or dynamic memory such as DRAM). The first computer system 830 and the second computer system 840 may each be implemented using a computer system 700 described above with respect to FIG. 7.

The first computer system 830 and the second computer system 840 may both attempt to obtain or check out floating licenses from license servers 850 (including License Server A 851, License Server B 852, and License Server C 853) through a network 802 when running jobs that require one or more different license types. When attempting to obtain such licenses, the first computer system 830 and the second computer system 840 collect status information regarding the license servers 850, such as whether a given license server has a particular license type available or fail to provide such a license, which may indicate that all such license types are checked out or that the license server does not posses the specified license type. The first computer system 830 and the second computer system 840 store the collected information about the license server in a shared license server information cache 860, which may also be connected to the first computer system 830 and the second computer system 840 through the network 802. The shared license server information cache 860 may be implemented as a database running on another computer system connected to the network 802.

Accordingly, for example, license server information collected by the first computer system 830 in the course of running a first job is then stored in the license server information cache 860 and that information collected by the first computer system 830 may be read by the second computer system 840 in the course of running a second job (after the first job) having the same license requirements (e.g., requiring the same type of license) as the first job, such that the processing device 841 of the second computer system 840 updates the order in which the license servers 850 are queried or accessed when attempting to obtain a floating license to run the second job. In this way, a shared license server information cache 860 allows different computer systems to benefit from license server information collected by other computers computer systems when attempting to obtain floating licenses for executing jobs.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

receiving an input job associated with a license type;

receiving a license server order comprising a plurality of license servers, wherein the license server order provides a first sequence for accessing the plurality of license servers;

reading license server information regarding licenses available from the plurality of license servers from a license server information cache;

updating, by a processing device, the license server order based on the license server information regarding the licenses available from the plurality of license servers to compute an updated license server order, wherein the updated license server order provides a second sequence for accessing the plurality of license servers in a sequence different from the first sequence, wherein the license server information comprises a status of a license server of the plurality of license servers, the status being selected from a group of states comprising a known non-existent license state, and wherein the updating the license server order is performed in accordance with iterating through the plurality of license servers in the license server order, where updating a position of a selected license server of the plurality of license server comprises:

in a case where the selected license server is in the known non-existent license state, demoting the selected license server to the end of the updated license server order; and accessing at least one of the plurality of license servers in the updated license server order to attempt license checkout of a license from one of the plurality of license servers, the license being appropriate for the license type of the input job.

2. The method of claim 1, further comprising writing updated license server information to the license server information cache based on results from the attempted license checkout from one or more of the plurality of license servers.

3. The method of claim 2, further comprising:

receiving a second input job associated with the license type;

receiving a second license server order comprising one or more of the plurality of license servers;

reading the updated license server information regarding the plurality of license servers from the license server information cache;

updating the second license server order based on the updated license server information to compute a second updated license server order; and accessing at least one of the plurality of license servers in the second updated license server order to attempt license checkout of a license from one of the plurality of license servers, the license being appropriate for the license type of the input job.

4. The method of claim 1, wherein the group of states further comprises:

a known existent license state;

an indeterminate state; and a new state.

5. The method of claim 4, wherein the updating the license server order is performed in accordance with:

leaving license servers in the new state and license servers in the indeterminate state in place;

promoting license servers in the known existent license state ahead of license servers in the indeterminate state up until reaching a license server in the new state or a license server in the known existent license state appearing earlier in the license server order; and demoting license servers in the known non-existent license state to the end of the license server order.

6. The method of claim 4, where updating a position of a selected license server of the plurality of license servers further comprises:

in a case where the selected license server is in the indeterminate state, leaving the selected license server in its current position in the updated license server order;

in a case where the selected license server is in the new state, leaving the selected license server in its current position in the updated license server order; and in a case where the selected license server is in the known existent license state, while a preceding license server in the updated license server order has an indeterminate state, updating the updated license server order by promoting the license server by one position.

7. The method of claim 4, further comprising writing updated license server information to the license server information cache based on a successful license checkout from a license granting license server of the plurality of license servers, wherein the updated license server information comprises setting a status of the license granting license server set to the known existent license state.

8. A system comprising:

a license server information cache;

a first computer system comprising:

a first memory storing instructions; and a first processor, coupled with the first memory and to execute the instructions, the instructions when executed cause the first processor to:

receive a first input job associated with a license type;

access at least one of a plurality of license servers to attempt license checkout of a license from one of the plurality of license servers, the license being appropriate for the license type of the first input job; and write updated license server information regarding licenses available from the at least one of the plurality of license servers to the license server information cache based on results from the attempted license checkout from one or more of the plurality of license servers, wherein the license server information comprises a status of a license server of the plurality of license servers, the status being selected from a group of states comprising:

a known existent license state; and an indeterminate state; and a second computer system comprising:

a second memory storing instructions; and a second processor, coupled with the second memory and to execute the instructions, the instructions when executed cause the second processor to:

receive a second input job associated with the license type;

receive a license server order comprising the plurality of license servers, wherein the license server order provides a first sequence for accessing the plurality of license servers;

read the updated license server information regarding the licenses available from the plurality of license servers from the license server information cache;

update the license server order based on the updated license server information regarding licenses available from the plurality of license servers to compute an updated license server order, wherein the updated license server order provides a second sequence for accessing the plurality of license servers in a sequence different from the first sequence, wherein the updating the license server order is performed in accordance with iterating through the plurality of license servers in the license server order, where updating a position of a selected license server of the plurality of license server comprises:

in a case where the selected license server is in the known existent license state, while a preceding license server in the updated license server order has an indeterminate state, updating the updated license server order by promoting the license server ahead of the preceding license server; and access at least one of the plurality of license servers in the updated license server order to attempt license checkout of a license from one of the plurality of license servers, the license being appropriate for the license type of the second input job.

9. The system of claim 8, wherein the group of states further comprises:

a known non-existent license state;

and a new state.

10. The system of claim 9, wherein the update of the license server order is performed in accordance with:

leaving license servers in the new state and license servers in the indeterminate state in place in the updated license server order;

promoting license servers in the known existent license state ahead of license servers in the indeterminate state up until a license in the new state or a license server in the known existent license state appearing earlier in the updated license server order; and demoting license servers in the known non-existent license state to the end of the updated license server order.

11. The system of claim 9, wherein the update of the license server order is performed in accordance with iterating through the plurality of license servers in the license server order, where updating a position of a selected license server of the plurality of license servers comprises:

in a case where the selected license server is in the indeterminate state, leaving the selected license server in its current position in the updated license server order;

in a case where the selected license server is in the new state, leaving the selected license server in its current position in the updated license server order;

and in a case where the selected license server is in the known non-existent license state, demoting the selected license server to the end of the updated license server order.

12. The system of claim 9, wherein the instructions stored in the first memory further comprise instructions that, when executed, cause the first processor to, in response to a successful license checkout from a license granting license server of the plurality of license servers, write the updated license server information to set the status of the license granting license server to the known existent license state.

13. The system of claim 9, wherein the instructions stored in the first memory further comprise instructions that, when executed, cause the first processor to, in response to a failed license checkout from a new license server in the new state, write the updated license server information to set the status of the new license server to the indeterminate state.

14. A non-transitory computer-readable medium comprising stored instructions, which when executed by a processor, cause the processor to:

receive an input job associated with a license type;

receive a license server order comprising a plurality of license servers, wherein the license server order provides a first sequence for accessing the plurality of license servers;

read license server information regarding licenses available from the plurality of license servers from a license server information cache, update, by the processor, the license server order based on the license server information regarding the licenses available from the plurality of license servers to compute an updated license server order, wherein the updated license server order provides a second sequence for accessing the plurality of license servers in a sequence different from the first sequence, wherein the license server information comprises a status of a license server of the plurality of license servers, the status being selected from a group of states comprising: a known existent license state; a known non-existent license state; and an indeterminate state, wherein the update of the license server order is performed in accordance with iterating through the plurality of license servers in the license server order, where updating a position of a selected license server of the plurality of license server comprises:

in a case where the selected license server is in the known existent license state, while a preceding license server in the updated license server order has an indeterminate state, updating the updated license server order by promoting the license server ahead of the preceding license server; and in a case where the selected license server is in the known non-existent license state, demoting the selected license server to the end of the updated license server order; and access at least one of the plurality of license servers in the updated license server order to attempt license checkout of a license from one of the plurality of license servers, the license being appropriate for the license type of the input job.

15. The non-transitory computer-readable medium of claim 14, further comprising stored instructions, which when executed by a processor, cause the processor to write updated license server information to the license server information cache based on results from the attempted license checkout from one or more of the plurality of license servers.

16. The non-transitory computer-readable medium of claim 15, further comprising stored instructions, which when executed by a processor, cause the processor to:

receive a second input job associated with the license type;

receive a second license server order comprising one or more of the plurality of license servers;

read the updated license server information regarding the plurality of license servers from the license server information cache;

update the second license server order based on the updated license server information to compute a second updated license server order; and access at least one of the plurality of license servers in the second updated license server order to attempt license checkout of a license from one of the plurality of license servers, the license being appropriate for the license type of the input job.

17. The non-transitory computer-readable medium of claim 14, wherein the group of states further comprises:

a new state.

18. The non-transitory computer-readable medium of claim 17, wherein the instructions to update the license server order perform the update in accordance with:

leaving license servers in the new state and license servers in the indeterminate state in place;

promoting license servers in the known existent license state ahead of license servers in the indeterminate state up until a license in the new state or a license server in the known existent license state appearing earlier in the license server order; and demoting license servers in the known non-existent license state to the end of the license server order.

19. The non-transitory computer-readable medium of claim 17, wherein updating a position of a selected license server of the plurality of license servers further comprises:

in a case where the selected license server is in the indeterminate state, leaving the selected license server in its current position in the updated license server order; and in a case where the selected license server is in the new state, leaving the selected license server in its current position in the updated license server order.

20. The non-transitory computer-readable medium of claim 17, further comprising stored instructions, which when executed by a processor, cause the processor to write updated license server information to the license server information cache based on a successful license checkout from a license granting license server of the plurality of license servers, wherein the updated license server information comprises a status of the license granting license server set to the known existent license state.

* * * * *